(12) United States Patent
Fu et al.

(10) Patent No.: US 10,039,042 B2
(45) Date of Patent: Jul. 31, 2018

(54) METHOD OF MULTI-RADIO INTERWORKING IN HETEROGENEOUS WIRELESS COMMUNICATION NETWORKS

(71) Applicant: MEDIATEK INC., Hsinchu (TW)

(72) Inventors: I-Kang Fu, Taipei (TW); Chao-Chin Chou, Taipei (TW)

(73) Assignee: MEDIATEK INC., HsinChu (TW)

( * ) Notice: Subject to any disclaimer, the term of this patent is extended or adjusted under 35 U.S.C. 154(b) by 0 days.

(21) Appl. No.: 15/082,144

(22) Filed: Mar. 28, 2016

(65) Prior Publication Data
US 2016/0212672 A1    Jul. 21, 2016

Related U.S. Application Data

(63) Continuation of application No. 13/065,038, filed on Mar. 11, 2011.
(Continued)

(51) Int. Cl.
*H04W 36/22*    (2009.01)
*H04W 28/08*    (2009.01)
(Continued)

(52) U.S. Cl.
CPC ........... *H04W 36/22* (2013.01); *H04W 12/06* (2013.01); *H04W 48/08* (2013.01); *H04W 48/10* (2013.01);
(Continued)

(58) Field of Classification Search
CPC ..... H04W 36/22; H04W 84/02; H04W 84/04; H04W 84/12; H04W 88/06; H04W 28/08;
(Continued)

(56) References Cited

U.S. PATENT DOCUMENTS

| 2003/0118015 A1 | 6/2003 | Gunnarsson et al. ........ 370/389 |
| 2003/0134636 A1 | 7/2003 | Sundar et al. ................ 370/338 |

(Continued)

FOREIGN PATENT DOCUMENTS

| CN | 101282664 A | 2/2003 |
| CN | 1765139 A | 4/2003 |

(Continued)

OTHER PUBLICATIONS

International Search Report and Written Opinion of International Search Authority for PCT/CN2011/071775 dated Jun. 23, 2011(12 pages).

(Continued)

*Primary Examiner* — Mohamed Kamara
(74) *Attorney, Agent, or Firm* — Imperium Patent Works; Zheng Jin; Helen Mao (57) ABSTRACT

A method of multi-radio interworking to provide integrated cellular and WLAN access for a multi-radio device is provided. A serving base station in a cellular network first obtains wireless local area network (WLAN) information and then forward the WLAN information to a serving device such that the serving device is capable to connect with both the cellular network and a WLAN. The WLAN information may comprise scanning information, WLAN QoS information, WLAN layer-3 information, or additional WLAN access point information. The WLAN information is forwarded based on triggering events associated with the serving base station information, WLAN coverage information, or the serving device information. Based on the received WLAN information, when entering WLAN coverage, the serving device activates its WLAN access to forward traffic from the cellular access network to the WLAN access network. When leaving WLAN coverage, the serving (Continued)

device deactivates its WLAN access to save power consumption.

22 Claims, 6 Drawing Sheets

Related U.S. Application Data (60) Provisional application No. 61/423,160, filed on Dec. 15, 2010, provisional application No. 61/313,182, filed on Mar. 12, 2010.

(51) Int. Cl.
| | |
|---|---|
| *H04W 48/10* | (2009.01) |
| *H04W 12/06* | (2009.01) |
| *H04W 48/08* | (2009.01) |
| *H04W 48/16* | (2009.01) |
| *H04W 88/06* | (2009.01) |
| *H04W 52/02* | (2009.01) |
| *H04W 84/12* | (2009.01) |
| *H04W 12/04* | (2009.01) |

(52) U.S. Cl.
CPC ............ *H04W 12/04* (2013.01); *H04W 48/16* (2013.01); *H04W 52/0274* (2013.01); *H04W 84/12* (2013.01); *H04W 88/06* (2013.01); *Y02D 70/00* (2018.01); *Y02D 70/1222* (2018.01); *Y02D 70/1242* (2018.01); *Y02D 70/1262* (2018.01); *Y02D 70/142* (2018.01); *Y02D 70/144* (2018.01); *Y02D 70/146* (2018.01); *Y02D 70/164* (2018.01)

(58) Field of Classification Search
CPC ..... H04W 92/04; H04W 92/16; H04W 92/20; Y02B 60/50
USPC ........ 370/252, 328, 329–33; 455/418, 435.1, 455/435.2, 432, 436
See application file for complete search history.

(56) References Cited

U.S. PATENT DOCUMENTS

| | | | |
|---|---|---|---|
| 2004/0176024 A1* | 9/2004 | Hsu ....................... H04L 12/189 455/3.04 |
| 2004/0203732 A1 | 10/2004 | Brusilovsky et al. ..... 455/426.1 |
| 2005/0197156 A1 | 9/2005 | Fourquin et al. .......... 455/553.1 |
| 2006/0045049 A1* | 3/2006 | Chung .............. H04W 36/0011 370/331 |
| 2006/0189331 A1 | 8/2006 | Lundsjo et al. ............. 455/458 |
| 2006/0217147 A1 | 9/2006 | Olvera-Hernandez et al. .......... 455/552.1 |
| 2007/0025296 A1 | 2/2007 | Jung et al. .................... 370/331 |
| 2007/0026866 A1 | 2/2007 | Krishnamurthi et al. .... 455/440 |
| 2007/0070935 A1 | 3/2007 | Prakash et al. ............... 370/328 |
| 2007/0076664 A1* | 4/2007 | An ....................... H04W 80/10 370/331 |
| 2007/0093201 A1 | 4/2007 | Hsu et al. ..................... 455/3.04 |
| 2008/0076454 A1 | 3/2008 | Yeh ............................. 455/466 |
| 2008/0102843 A1* | 5/2008 | Todd ..................... H04W 36/18 455/445 |
| 2008/0198818 A1 | 8/2008 | Montemurro et al. ....... 370/338 |
| 2008/0304458 A1 | 12/2008 | Aghvami et al. ............. 370/338 |
| 2009/0239543 A1 | 9/2009 | Kozu ............................ 455/445 |
| 2009/0245206 A1 | 10/2009 | Liu ............................... 370/331 |
| 2010/0054205 A1 | 3/2010 | Kalhan ......................... 370/331 |
| 2010/0118847 A1 | 5/2010 | Lee et al. ...................... 370/338 |
| 2010/0150120 A1 | 6/2010 | Schlicht et al. .............. 370/338 |
| 2010/0165861 A1 | 7/2010 | Rrdland et al. ............... 370/252 |
| 2010/0291863 A1 | 11/2010 | Hsu et al. .................... 455/3.04 |
| 2011/0026506 A1 | 2/2011 | Macnaughtan et al. ...... 370/338 |
| 2011/0205946 A1* | 8/2011 | Avital ............... H04W 36/0083 370/311 |
| 2012/0231777 A1 | 9/2012 | Lewis et al. .................. 455/418 |
| 2012/0281616 A1 | 11/2012 | Calvanese Strinati ....... 370/315 |

FOREIGN PATENT DOCUMENTS

| | | |
|---|---|---|
| CN | 101107869 A | 1/2005 |
| CN | 1909732 A | 7/2006 |
| CN | 101155372 A | 9/2006 |
| CN | 101203024 A | 12/2006 |
| EP | 1616446 A1 | 4/2003 |
| EP | 2154919 A1 | 6/2008 |
| JP | 2006217196 | 2/2005 |
| WO | WO2004077753 A2 | 2/2003 |
| WO | WO2004091246 A1 | 4/2003 |
| WO | WO2007008572 A2 | 7/2005 |
| WO | WO2007008572 A3 | 7/2005 |
| WO | WO2007038781 A1 | 9/2005 |
| WO | WO2007052720 | 11/2005 |
| WO | WO2008084621 | 1/2007 |
| WO | WO2010028278 A2 | 9/2008 |

OTHER PUBLICATIONS

The Examination Report of SIPO for the Chinese patent application 201180001060.X (no English translation is available) dated Mar. 5, 2013 (9 pages).
JPO, Office Action of JP patent application 2012-557385 dated Oct. 22, 2013 (4 pages).
Taiwan IPO, Office Action of TW patent application 100108478 (no English translation is available) dated Jan. 17, 2014 (10 pages).
EPO, Search Report for the EP patent application 11752851.3 dated Nov. 13, 2015 (7 pages).
SIPO, Search Report for the CN patent application 201180001060.X (no English translation is available) dated Mar. 23, 2016 (7 pages).
EPO, Search Report for the EP patent application 11752851.3 dated Dec. 6, 2016 (8 pages).
EPO, Search Report for the EP patent application 17163929.7 dated Jul. 13, 2017 (11 pages).

* cited by examiner

METHOD OF MULTI-RADIO INTERWORKING IN HETEROGENEOUS WIRELESS COMMUNICATION NETWORKS

CROSS REFERENCE TO RELATED APPLICATIONS

This application is a continuation, and claims priority under claims priority under 35 U.S.C. § 120 from nonprovisional U.S. patent application Ser. No. 13/065,038, entitled "METHOD OF MULTI-RADIO INTERWORKING IN HETEROGENEOUS WIRELESS COMMUNICATION NETWORKS," filed on Mar. 11, 2011, the subject matter of which is incorporated herein by reference. application Ser. No. 13/065,038, in turn claims priority under 35 U.S.C. § 119 from U.S. Provisional Application No. 61/313,182, entitled "Method of Smart Interworking to Support Integrated Multi-Radio Wireless Communication Terminals in Heterogeneous Wireless Communication Networks," filed on Mar. 12, 2010; U.S. Provisional Application No. 61/423,160, entitled "Method of Smart Interworking to Offload Traffic from Cellular Network to WiFi Network," filed on Dec. 15, 2010; the subject matter of which is incorporated herein by reference.

TECHNICAL FIELD

The disclosed embodiments relate generally to wireless network communication, and, more particularly, to multi-radio interworking in heterogeneous wireless communication networks.

BACKGROUND

Demand on mobile data service continues to grow dramatically in the recent years. The growth in demand is driven by modern portable handheld devices, such as smart phone, tablet PC, portable router etc. The growth in demand is also driven by new applications, such as streaming video, e-book, online gaming etc. Studies have shown that the demand for mobile data service is expected to grow more than fifty times from year 2008 to 2013.

To meet this fast growing demand in mobile data service, various network operators are developing new technologies and defining new standards for the next generation wireless networks to achieve much higher peak transmission rate. For example, 1 Gbps peak transmission rate is required by ITU-R for IMT-Advanced systems in the $4^{th}$ generation ("4G") mobile communications systems. 1 Gbps peak transmission rate in wireless networks can provide users similar experience as in wireline networks, and it is sufficient to satisfy most applications on the Internet today and in the near future.

While peak transmission rate is no longer a critical problem after 4G era, network capacity is likely to be exhausted very soon in the next few years. Not only traffic demand is growing dramatically (i.e., >50× in 5 years), but also the improvement on average cell spectral efficiency is very limited from 3G to 4G era (i.e., <10×). In addition, the available spectrum resource is also limited. Network capacity will still be exhausted very soon even all the networks are upgraded with 4G air interface. This problem in fact already happens in some areas. Therefore, capacity exhaustion is anticipated to be the most critical problem during 4G and beyond 4G (B4G) era.

While the demand on wireless communication service continues to increase, the demand on broadband access may not always require mobility support. In fact, studies have shown that only a small fraction of users demand on simultaneous mobile and broadband access. Therefore, in addition to cellular networks, there are other networks able to deliver information to mobile users, with or without mobility support. In most geographic areas, multiple radio access networks (RANs) such as E-UTRAN and WLAN are usually available. Furthermore, wireless communication devices are increasingly being equipped with multiple radio transceivers for accessing different radio access networks. For example, a multiple radio terminal (MRT) may simultaneously include Bluetooth, WiMAX, and WiFi radio transceivers. Thus, multi-radio integration becomes more feasible today and is the key to help user terminals to explore more bandwidth available from different radio access technologies and achieve better utilization of scarce radio spectrum resources.

Multi-radio integration needs to be achieved from two perspectives. From the network perspective, much research has already been done since 3G era on inter-networking for traffic routing and offloading in the backhaul (i.e., wireline) network. On the other hand, from the device perspective, certain research has just been initiated to investigate how different radio access networks can interwork with each other to prevent mutual interference. However, it has not been well studied on how different radio interfaces of the same device can interwork to improve transmission efficiency, and how radio access networks can help the device with shared components for different radio interfaces to work well together.

SUMMARY

A method of multi-radio interworking to provide integrated cellular and WLAN access for a multi-radio device in a wireless communication network is provided. A serving base station in a cellular network first obtains wireless local area network (WLAN) information of a WLAN and then forward the WLAN information to a serving device such that the serving device is capable to connect to both the cellular network and the WLAN. The WLAN information may comprise scanning information, WLAN QoS information, WLAN layer-3 information, or additional WLAN access point (AP) information.

The WLAN information is forwarded by the serving base station to the serving device based on certain triggering events associated with the serving base station information, WLAN coverage information, or the serving device information. For example, the triggering events may be associated with the serving base station cell coverage, WLAN coverage information including a WLAN AP location and the WLAN service coverage, and the serving device information including device location, device footprint, device measurement result over the serving base station, or device WLAN capability.

Based on the received WLAN information, when entering WLAN coverage, the serving device activates access to the WLAN via its WLAN transceiver to offload traffic from the cellular access network to the WLAN access network. When leaving WLAN coverage, the serving device timely deactivates access to the WLAN via its WLAN transceiver to save power consumption. Therefore, by obtaining and forwarding the WLAN information, the serving base station in a cellular network is able to assist its serving device to offload traffic to a WLAN network to improve efficiency and utilization.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
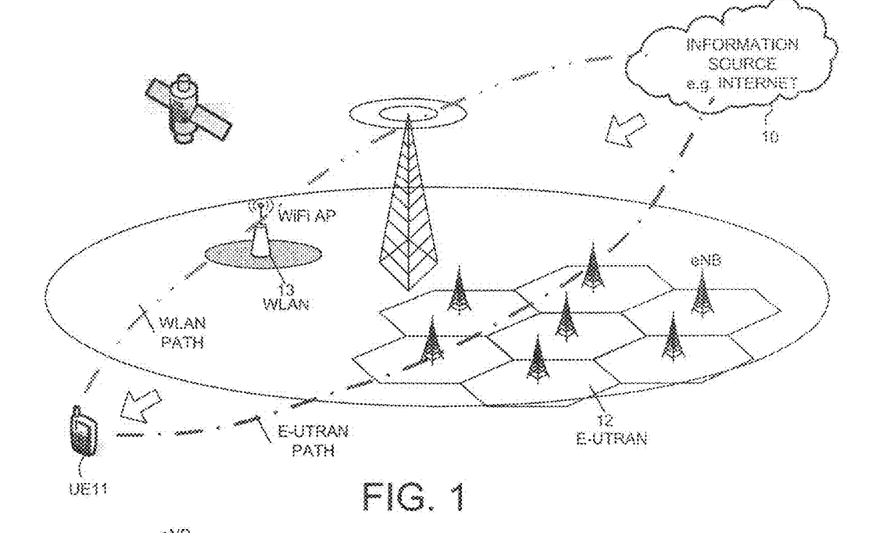
FIG. 1 illustrates multiple radio access networks for a user terminal to access information source in accordance with one novel aspect.

FIG. 1 illustrates multiple radio access networks for a user terminal 11 to access information source 10 in accordance with one novel aspect. A radio access network (RAN) is part of a mobile telecommunication system implementing a radio access technology. In most geographic areas, multiple radio access networks are usually available for user terminal 11 to access information source 10 (e.g., the Internet) and obtain mobile data service. Examples of different radio access network types are GSM radio access network, UTRA or E-UTRA cellular access network, WiMAX system, and Wireless Local Area Network (WLAN). If the multiple RANs support the same air interface, then the entire access network is a homogeneous network. On the other hand, if the multiple RANs support different air interfaces (e.g. cellular and WiFi), then the entire access network is a heterogeneous network. From a user terminal point of view, it does not matter which access network the desired information is delivered through, as long as data service is maintained with fast speed and high quality. In accordance with one novel aspect, with multi-radio integration, user terminal 11 is a multi-radio terminal (MRT) and is able to explore more bandwidth available from different radio access networks, both homogeneous and heterogeneous, for improved per terminal performance and/or optimized radio resource utilization.

Depending on the standard, a user terminal or mobile phone is varyingly known as user equipment (UE), terminal equipment, and mobile station (MS) etc. In the example of FIG. 1, user terminal 11 is referred to as UE11, and is equipped with both a cellular radio module and a WiFi radio module. UE11 may access the Internet via an E-UTRAN path (denoted by a dashed line with single dot) using its cellular module. Alternatively, UE11 may access the Internet via a WLAN path (denoted by a dashed line with double dots) using its WiFi module. In one advantageous embodiment, the cellular radio module and the WiFi radio module of UE11 cooperates with each other to provide integrated cellular and WiFi access over both E-UTRAN 12 and WLAN 13 to improve transmission efficiency and bandwidth utilization.

Figure 2:
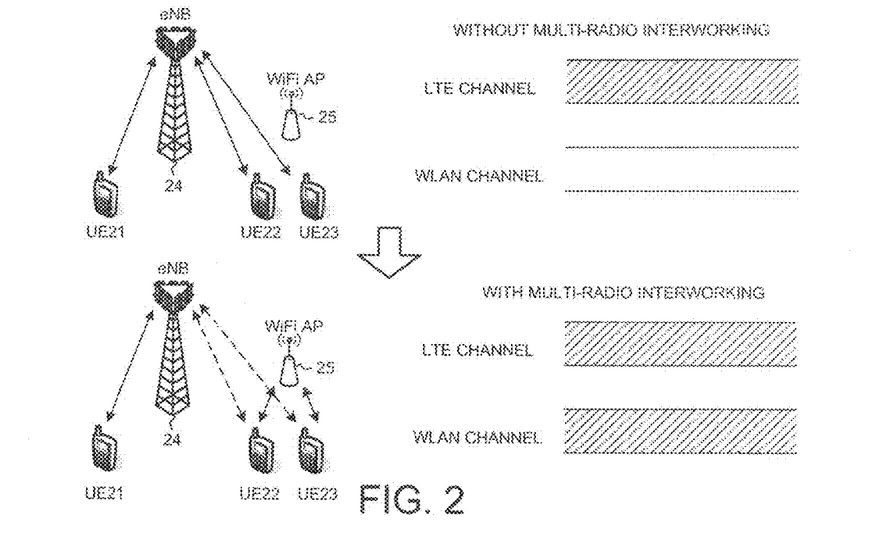
FIG. 2 illustrates an example of multi-radio integration with integrated cellular plus WLAN access.

FIG. 2 illustrates an example of multi-radio integration with integrated cellular (e.g., E-UTRAN) and WiFi (e.g., WLAN) access. E-UTRAN is the cellular air interface of 3GPP Long Term Evolution (LTE) upgrade path for mobile networks. It is the abbreviation for Evolved UMTS Terrestrial Radio Access Network, also known as the Evolved Universal Terrestrial Radio Access (E-UTRA) in early drafts of the 3GPP LTE specification. On the other hand, WiFi is a term that describes a range of connectivity technologies including Wireless Local Area Network (WLAN) based on the IEEE 802.11 standards, device-to-device connectivity, and a range of technologies that support PAN, LAN, and even WAN connectivity. In the example of FIG. 2, user equipments UE21, UE22, and UE23 are located within the cell coverage of a base station eNB24 in a cellular E-UTRAN radio access network. In addition, UE22, and UE23 are also located within the coverage of a WiFi access point WiFi AP25 in a WLAN access network.

As illustrated in the top half of FIG. 2, user equipments UE21-23 are served by serving base station eNB24 via an established LTE channel for data communication (denoted by slashed shade). User equipments UE21-23, however, do not establish any WLAN channel with WiFi AP25 for data communication (denoted by white shade). For example, without multi-radio integration technology, user equipments UE21-23 are not even aware of the existence of WiFi AP25 and the availability of any WLAN access. It can be seen that, without multi-radio interworking, network bandwidth of the WLAN access network is not utilized by the user equipments UE21-23 at all.

On the other hand, as illustrated in the bottom half of FIG. 2, user equipments UE21-23 are served by serving base station eNB24 via an established LTE channel for data communication (denoted by slashed shade). In addition, user equipments UE22-23 also establish a WLAN channel with WiFi AP25 to offload data traffic from the LTE channel to the WiFi channel (denoted by slashed shade). For example, the serving base station eNB24 in the cellular network may inform UE22-23 the availability of WLAN access through WiFi AP25 using multi-radio integration technology. It can be seen that, with multi-radio interworking, network bandwidth of both the E-UTRAN and the WLAN access network are efficiently utilized by the user equipments UE21-23 to improve transmission efficiency.

In one advantageous aspect, the network operator of the cellular network may have established certain business service agreement with the network operator of the WLAN network to facilitate the above-described multi-radio integration and interworking. In one example, the network operator of the cellular network may be the same entity as the network operator of the WLAN network. In a first scenario, the network operator charges a flat fee on its users for aggregated mobile data service. In a second scenario, the network operator charges its fee based on transmitted data volume. In both scenarios, via the above-described multi-radio interworking, the network operator is able to provide better service to the users while charging comparable fees.

Multi-radio integration does not happen overnight. Instead, it requires long-term planning with a well-defined technology migration roadmap. In general, the first stage in the technology migration roadmap is defined as multi-radio coexistence stage, during which multiple radio interfaces co-exist in the same terminal and are able to mitigate interference such that different radio access networks can work well independently. The second stage in the technology migration roadmap is defined as multi-radio cooperation stage, during which multiple radio interfaces are able to interwork with each other in the same terminal such that radio resources over different networks are leveraged for better per terminal performance. The third and final stage in the technology migration roadmap is defined as multi-radio cognition stage, during which multiple radio interfaces are able to interwork with each other for resource optimization such that the same radio resource can be flexibly shared by different radio interfaces. The three different stages are now described below with accompanying drawings.

Figure 3:
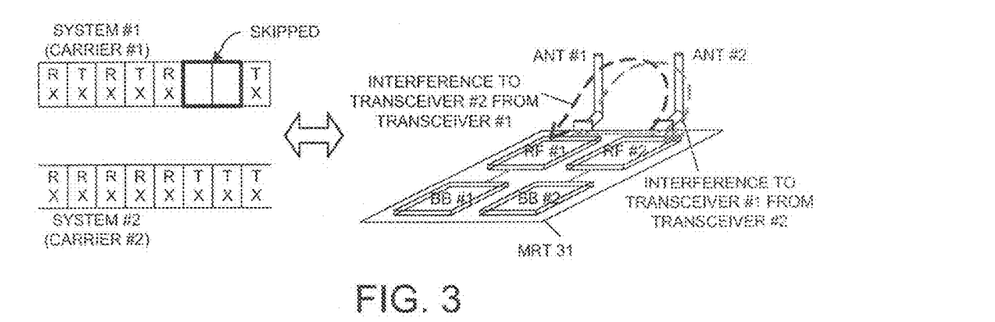
FIG. 3 illustrates multi-radio coexistence as the first stage in technology migration roadmap.

FIG. 3 illustrates multi-radio coexistence as the first stage in multi-radio integration technology migration roadmap. During the stage of multi-radio coexistence, multiple radio modules co-exist in a multi-radio terminal (MRT) for simultaneous and independent data communication over different systems (e.g., system #1 over RF carrier #1 and system #2 over RF carrier #2 as illustrated in FIG. 3). The objective of this stage is to mitigate the coexistence interference from the radio modules co-located on the same device platform. In the example of FIG. 3, MRT 31 comprises a first radio transceiver including a first RF module (RF#1), a first baseband module (BB#1), and a first antenna (ANT#1), and a second radio transceiver including a second RF module (RF#2), a second baseband module (BB#2), and a second antenna (ANT#2). For example, RF#1 is a Bluetooth (BT) module and RF#2 is a cellular module. Simultaneous operation of the multiple radio transceivers co-located on the same physical device, however, can suffer significant degradation including significant interference between them because of the overlapping or adjacent radio spectrums. Due to physical proximity and radio power leakage, when the transmission of data for RF#1 overlaps with the reception of data for RF#2 in time domain, the reception of RF#2 may seriously suffer due to interference from the transmission of RF#1. Likewise, data transmission of RF#2 may also interfere with data reception of RF#1.

Research has already been initiated to investigate how different radio access networks could interwork with each other to prevent mutual interference. Various methods of scheduling transmitting and receiving time slots for co-located radio transceivers have been proposed. For example, a BT device (e.g., RF#1) first synchronizes its communication time slots with a co-located cellular radio module (e.g., RF#2), and then obtains the traffic pattern of the co-located cellular radio module. Based on the traffic pattern, the BT device selectively skips one or more TX or RX time slots to avoid data transmission or reception in certain time slots and thereby reducing interference with the co-located cellular radio module. The skipped time slots are disabled for TX or RX operation to prevent interference and to achieve more energy saving. For additional details on multi-radio coexistence, see: U.S. patent application Ser. No. 12/925,475, entitled "System and Methods for Enhancing Coexistence efficiency for multi-radio terminals," filed on Oct. 22, 2010, by Ko et al. (the subject matter of which is incorporated herein by reference).

Figure 4:
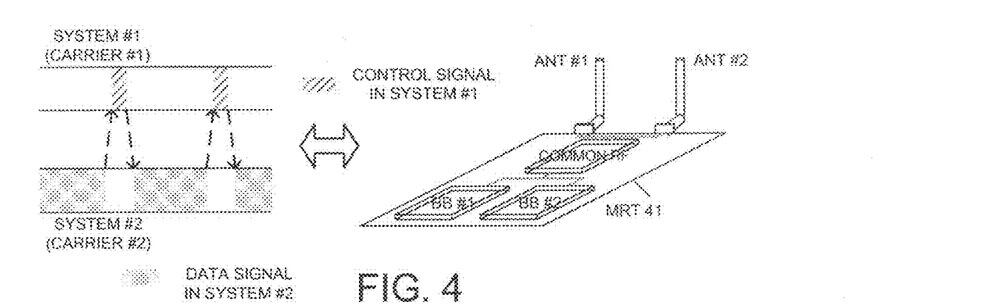
FIG. 4 illustrates multi-radio cooperation as the second stage in technology migration roadmap.

FIG. 4 illustrates multi-radio cooperation as the second stage in multi-radio integration technology migration roadmap. During the stage of multi-radio cooperation, multiple radio modules interwork with each other in a multi-radio terminal (MRT) for efficient data communication over different systems (e.g., system #1 over RF carrier #1 and system #2 over RF carrier #2 as illustrated in FIG. 4). The objective of this stage is efficient inter-networking to help the MRT to maintain connections in multiple systems with reduced hardware complexity. From system operation point of view, MRT41 maintains logical connection with system #1 (denoted by dashed shade) while being able to offload data traffic to system #2 (denoted by dotted shade). New protocols may be required in this cooperation stage to help MRT41 to switch between two systems without losing control signals and connectivity. From device structural point of view, MRT 41 may comprise a common radio frequency module (COMMON RF), two independent baseband modules (BB #1 and BB #2), and two separate antennas (ANT#1 and ANT#2).

Figure 5:
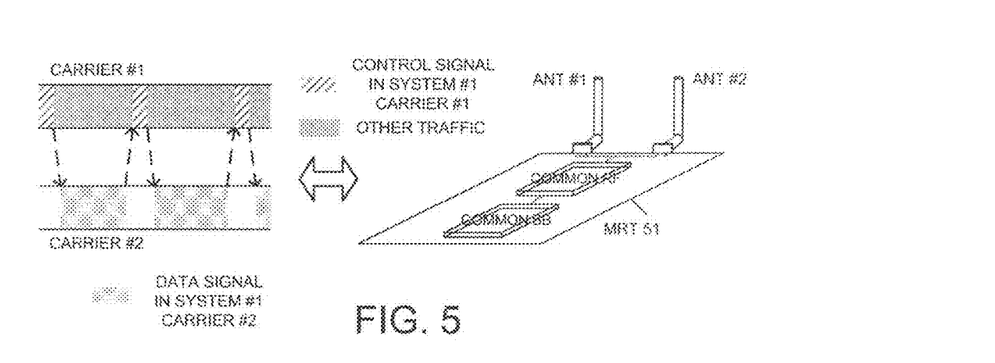
FIG. 5 illustrates multi-radio cognition as the third stage in technology migration roadmap.

FIG. 5 illustrates multi-radio cognition as the third stage in multi-radio integration technology migration roadmap. During the final stage of multi-radio cognition, multiple radio modules interwork with each other in a multi-radio terminal (MRT) for optimized data communication over different radio access networks in the same system. The objective of this stage is to optimize radio (spectrum) resource utilization while minimizing hardware complexity. Ideally, unnecessary waste on radio resource over all considered spectrum portions is prevented. From system operation point of view, MRT51 is connected to system #1 and receives control signal in system #1 over carrier #1 (denoted by slashed shade). In addition, MRT51 also receives data signal in system #1 over carrier #2 (denoted by dotted shade). This is because MRT51 is able to switch between different RF carriers together with its serving base station or WiFi access point in the same system. Moreover, a different user may simultaneously obtain data service over carrier #1 in system #1 (denoted by grey-fill shade). From device structural point of view, MRT 51 may comprise a common radio frequency module (COMMON RF), a common baseband module (COMMON BB), and two separate antennas (ANT#1 and ANT#2). By achieving radio resource sharing with minimized hardware complexity, multi-radio cognition is the final stage to be reached in the near future for multi-radio interworking.

While research has been initiated to investigate how different radio access networks could interwork with each other to prevent mutual interference during the multi-radio coexistence stage, it has not been well studied on how different radio interfaces of the same device can interwork to improve transmission efficiency. Especially, it has not been well studied on how radio access networks can help the device with shared components for different radio modules and transceivers to work well together. It has been realized, however, multi-radio integration is difficult to achieve without network and system support. This problem becomes more serious when considering multi-radio cooperation and cognition. For example, user terminal does not know the time instance it can switch to different carriers in FIGS. 4 and 5. Without proper assistance, user terminal needs to be designed in response to the worst scenario, e.g., simultaneous transmit and receive by different radio transceivers.

Figure 6:
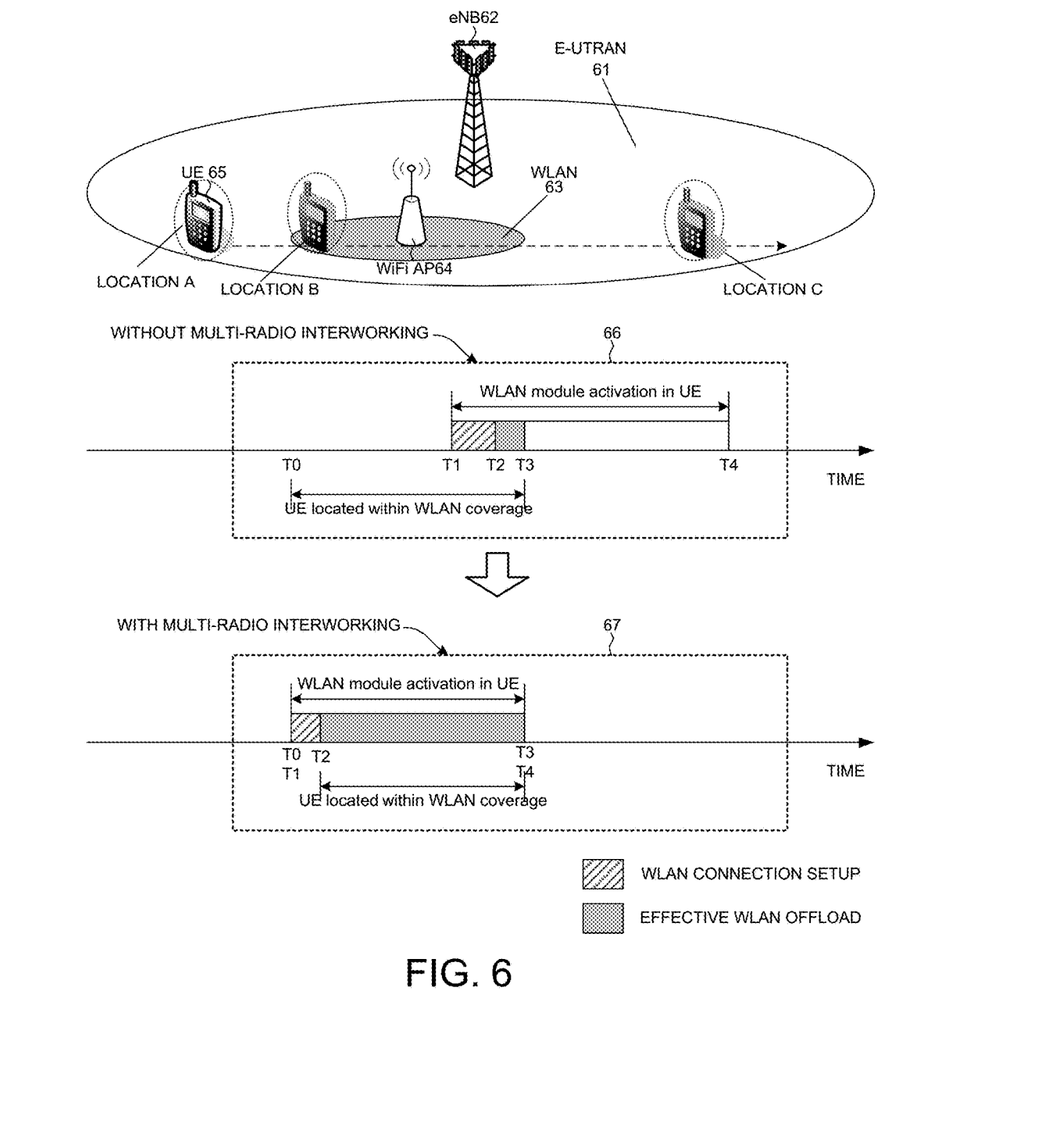
FIG. 6 illustrates an example of multi-radio interworking of a user terminal in a cellular network having WLAN coverage.

FIG. 6 illustrates an example of multi-radio interworking of a user terminal in a cellular network having WLAN coverage in accordance with one novel aspect. The example of FIG. 6 takes cellular network (e.g., LTE) as system #1 and WiFi (e.g., WLAN) as system #2 with respect to FIGS. 4 and 5. The example of FIG. 6 also takes traffic offloading (e.g., forwarding) as one main embodiment of multi-radio interworking. More specifically, data traffic of the user terminal can be offloaded from a cellular access network to a WLAN access network to improve transmission efficiency. It should be noted, however, that the problem is generic and the solution is applicable to many other system combinations.

In the example of FIG. 6, cellular radio access network E-UTRAN 61 comprises a serving base station eNB62, and WLAN 63 comprises a WiFi access point AP64. User equipment UE65 and AP64 are both located within the cell coverage provided by eNB62. UE65 is initially served by its serving base station eNB62 via LTE cellular air interface at a first location A. When UE65 moves to a second location B later, it is then located inside the coverage provided by WiFi AP64 for WLAN access. Subsequently, UE65 moves to a third location C, where WLAN access is no longer available.

Without multi-radio integration, UE65 served by eNB62 cannot connect or disconnect to WiFi AP64 efficiently. Because of the limited WLAN coverage, UE65 has no idea when to scan WiFi AP64. The current method is that WiFi service provider may advertise its WiFi availability in some specific areas such as McDonald, café, restaurant, etc. The user of UE65 then manually activates the WLAN module to scan and access the WLAN network. The user, however, may not notice the WiFi advertisement and thus may not activate the WLAN module immediately after moving inside of the WLAN coverage. In addition, the user may forget to deactivate the WLAN module when moving outside of the WLAN coverage.

As illustrated by timeline 66 in FIG. 6, the user of UE65 moves to location B at time T0. The user manually activates the WLAN module of UE65 to scan WiFi AP64 and access WLAN 63 at time T1. UE65 is connected to WLAN 63 at time T2 after WLAN connection setup. Effective WLAN traffic offload then occurs from time T2 to time T3. At time T3, the user moves outside of the WLAN coverage. Finally, the user remembers to deactivate the WLAN module of UE65 at time T4. As a result, the cellular network E-UTRAN 61 is not able to offload traffic to WLAN 63 for UE65 when the user forgets to turn on the WLAN module of UE65 from time T0 to T1. In addition, UE65 wastes power consumption when the user forgets to turn off the WLAN module of UE65 from time T3 to T4. From timeline 66, it can be seen that although UE65 is located within WLAN coverage from time T0 to T3, the actual WLAN traffic offload time period (from time T2 to T3) is very short, at the cost of activating the WLAN module for a relative long time period (from time T1 to T4).

On the other hand, with multi-radio integration, UE65 has certain information on WLAN 63 including the WLAN access and coverage information and thus can connect or disconnect to WiFi AP64 efficiently. In general, when a UE served by a serving base station in a cellular network enters a location with WLAN access, WLAN access will be activated via its WLAN module and WLAN connection setup will be started automatically after entering the WLAN coverage area. As a result, the UE will have established connection to both the cellular network and the WLAN. Furthermore, the serving base station in the cellular network may assist the UE during connection setup to reduce the setup time. When the UE leaves the WLAN coverage area, WLAN access will be timely deactivated via its WLAN module to save power consumption.

As illustrated by timeline 67 in FIG. 6, the user moves to location B at time T0. At the same time T1=T0, the WLAN module of UE65 is activated to scan WiFi AP64 and access WLAN 63. At time T2, UE65 is connected to WLAN 63 and data traffic of UE65 is offloaded from E-UTRAN 61 to WLAN 63. At time T3, the user moves outside of the WLAN coverage area. Finally, at the same time T4=T3, the WLAN module of UE65 is deactivated to save power consumption. From timeline 67, it can be seen that when UE65 is located within WLAN coverage from time T0 to T3, data traffic of UE65 is offloaded from E-UTRAN 61 to WLAN 63 to improve transmission efficiency during a majority of time period (from time T2 to T3). Furthermore, the connection setup time (from time T1 to T2) is shorter as compared to timeline 66, and the WLAN activation time (from T1 to T4) is shorter as compared to timeline 66 without multi-radio interworking.

To facilitate the above-described traffic offloading from a cellular access network to a WLAN, it is necessary for a UE to obtain certain WLAN information. For example, it is desirable for the UE to know when it should activate the WLAN module, where to scan WiFi AP over which WiFi channel, which WiFi AP it can or prefer to access, how to complete the WLAN setup with reduced time, and when to deactivate the WLAN module. In accordance with one novel aspect, the serving eNB of the UE will first obtain the WLAN information (e.g., a first step illustrated below in FIG. 7), and then forward the WLAN information to the UE under some triggering events to facilitate the WLAN offload operational procedure (e.g., a second step illustrated below in FIG. 8).

Figure 7:
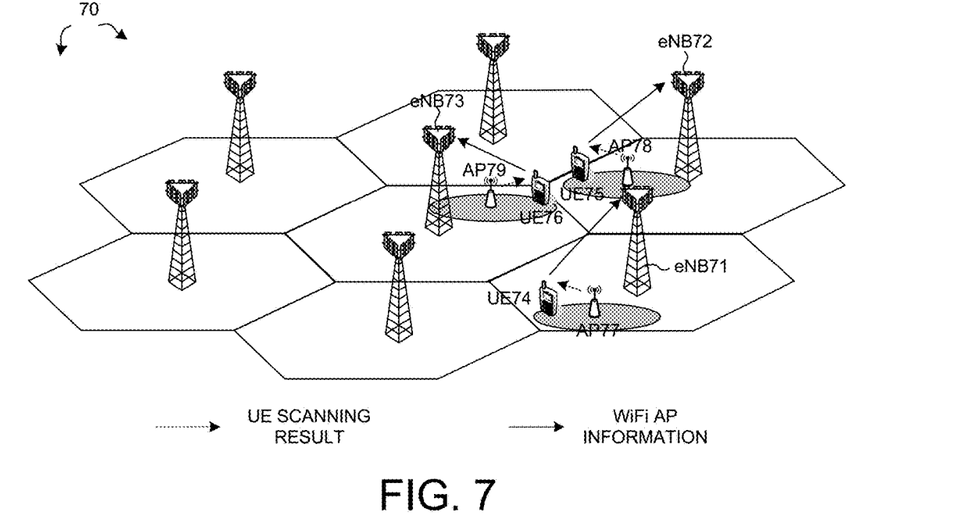
FIG. 7 illustrates a first step in WLAN offload operational procedure.

FIG. 7 illustrates a first step in WLAN offload operational procedure in a cellular network 70. Cellular network 70 comprises a plurality of base stations (eNBs) including eNB71, eNB72, and eNB73, and a plurality of serving devices (UEs) including UE74, UE75, and UE76. The cell coverage of some of the eNBs overlaps with the coverage of a plurality of WLANs, and each WLAN comprises a WiFi access point (AP) including AP77, AP78, and AP79 to provide WLAN access. In the example of FIG. 7, serving base station eNB71 serves serving device UE74, which is located inside the WLAN coverage provided by WiFi AP77. Similarly, serving base stations eNB72-eNB73 serve serving devices UE75-UE76, which are located inside the coverage provided by WiFi AP78-AP79, respectively.

For UEs that have established connection with a corresponding WiFi AP, or for UEs that have performed scanning over a corresponding WiFi AP (e.g., as denoted by dashed arrows in FIG. 7), they have obtained certain WLAN information based on the UE scanning result. In accordance with one novel aspect, these UEs can transmit the WLAN information to its serving eNB (e.g., as denoted by solid arrows in FIG. 7). For example, UE74 obtains WiFi AP77 information via scanning and then transmits the information to eNB71. Similarly, UE75-UE76 obtains WiFi AP78-AP79 information via scanning and then transmits the information to eNB72-eNB73. The serving base stations then understand which WiFi AP has coverage overlapped with which cell coverage in the cellular network.

Figure 8:
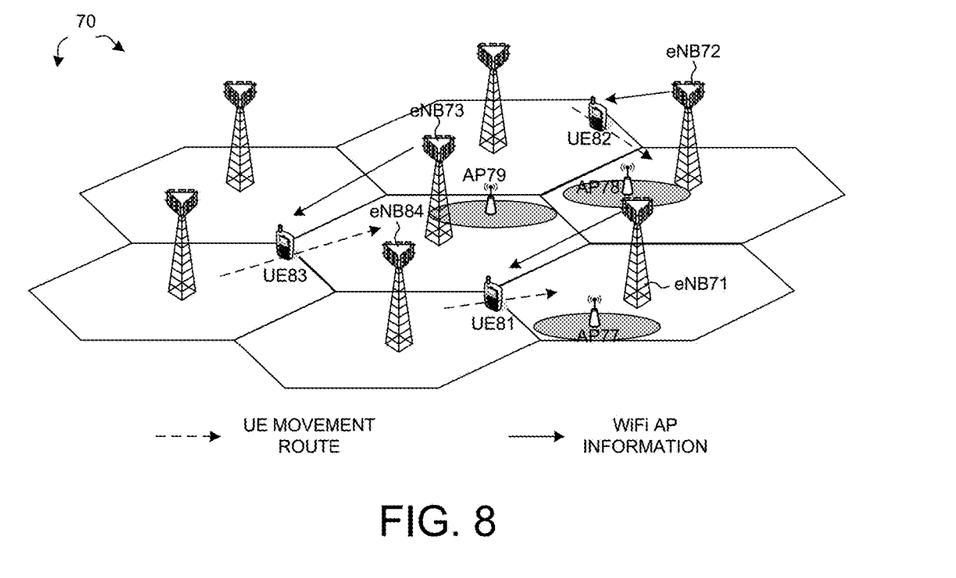
FIG. 8 illustrates a second step in WLAN offload operational procedure.

FIG. 8 illustrates a second step in WLAN offload operational procedure in cellular network 70. In the second step of WLAN offload operational procedure, the serving base stations in the cellular network forward the obtained WLAN information to their serving devices based on certain triggering events. In the example of FIG. 8, UE81 moves toward eEB71 and handovers from eNB84 to eNB71. When UE81 handovers to eNB71 (e.g., one of the triggering events), eNB71 forwards the obtained WLAN information (e.g., WiFi AP77 information) to UE81. As a result, when UE81 moves toward a location with WLAN coverage, UE81 automatically activates WLAN access via its WLAN module to search and connect with WiFi AP77 based on the WLAN information offered by eNB71. Similarly, when UE81 moves away from the location with WLAN coverage, UE81 automatically deactivates WLAN access via its WLAN module to save power.

Handover is only one of the triggering events for a serving base station to forward WLAN information to its serving device. The triggering events may be associated with the serving base station information such as the serving eNB location and coverage information (e.g., when a UE handovers to the serving eNB), WLAN coverage information such as its WiFi AP location (e.g., identified by GNSS or network positioning) and coverage (e.g., identified WiFi AP within eNB cell coverage), and the serving device information such as device location (e.g., identified by GNSS or network positioning), device footprint (e.g., a list of cell ID identified by the serving UE connected with that WiFi AP with or without the associated measurement results), device measurement results (e.g., by RSRP, RSRQ, or CQI of the serving or neighboring eNB), and device WiFi capability previously reported to the serving eNB.

Figure 9:
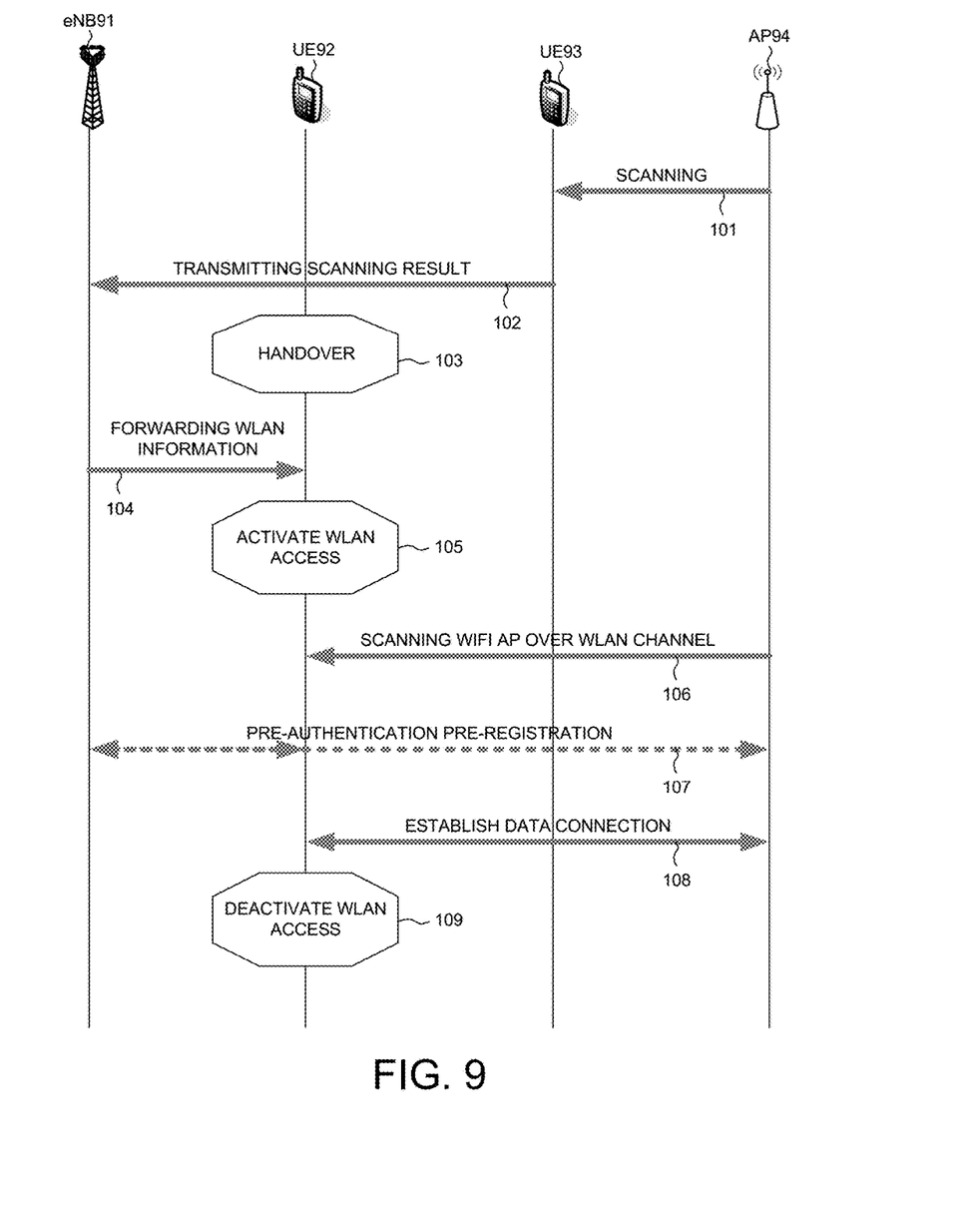
FIG. 9 illustrates one embodiment of a complete WLAN offload procedure in accordance with one novel aspect.

FIG. 9 illustrates one embodiment of a complete WLAN offload procedure in a cellular network in accordance with one novel aspect. The cellular network comprises a serving base station eNB91, user equipments UE92 and UE93, and a WiFi access point AP94 that provides overlapping WLAN coverage with the cell coverage of eNB91. Both UE92 and UE93 are equipped with a WLAN module and a cellular module. Alternatively, UE92 and UE93 may be equipped with a common RF module that can be shared for WLAN and LTE access. In the example of FIG. 9, UE93 is located within WLAN coverage provided by WiFi AP94. UE93 performs scanning and thereby obtains scanning result over the WLAN frequency channels used by WiFi AP94 (step 101). The scanning result may comprise the service set identifier (SSID) of WiFi AP94, the frequency channel used by WiFi AP94, the received signal strength, the WLAN signal and/or protocol version (e.g., IEEE 802.11a/b/g/n), the WLAN mode (e.g., infrastructure mode, ad-hoc mode, or portable router), and the IP address of WiFi AP94. The scanning result may further comprise WLAN connection quality (QoS) information such as the service latency and the achievable throughput of WiFi AP94, the location when WiFi AP94 was scanned or connected by UE93, the footprint when WiFi AP94 was scanned or connected by UE93, and the measurement results by UE93 over the cellular network when UE93 scanned or is connected to WiFi AP94.

Next, UE93 transmits the scanning result to its serving eNB91 (step 102). As a result, eNB91 obtains WLAN information based on the scanning result. The obtained WLAN information generally is very helpful for other UEs (e.g., UE92) to determine whether it should activate its WLAN module and where to scan for WiFi APs. In addition to obtaining the WLAN information based on the scanning result described above, eNB91 may obtain the WLAN information or additional WLAN information through other mechanism, such as from the server in backhaul network or from the WiFi AP itself. For example, the WLAN information may further comprise WLAN layer-3 information (e.g., WLAN gateway IP address, DNS IP address, DHCP server IP address), device IP address to be used in WLAN, and I-WLAN information (e.g., wireless access gateway (WAG) address, available public land mobile network (PLMN) attached to this WLAN). In another embodiment, the WLAN information may comprise additional information to help the device to determine which WiFi AP it can access, prefers to access, or is disallowed to access. Furthermore, the WLAN information may comprise authentication information and requirement by the WiFi AP, the charging policy of the WiFi AP, the access priority of the WiFi AP (e.g., high priority to cellular operator's own WiFi AP), the required registration information by the WiFi AP, the loading of the WiFi AP, the remaining capacity of the WiFi AP, the achievable throughput of the WiFi AP, and the service latency of the WiFi AP.

In one embodiment, eNB91 may indicate to the UE the prioritized WiFi AP to be accessed based on the cellular operator's policy. In one example, the WiFi AP deployed by serving operator itself (e.g. CMCC) or the WiFi AP deployed by the other operator who has roaming agreement with the serving operator has higher priority. In another example, the cellular operator may not want UE to access other public WiFi AP in order to maximize its revenue from data access if the charging is based on transmitted data volume. In yet another example, the cellular operator may want UE to access public WiFi AP as much as possible if the charging is by flat rate. In another embodiment, different WLAN access policy can be applied when the WiFi AP is connected with different backhaul (e.g., wireline broadband backhaul or wireless backhaul). For example, a cellular network operator may not want the UEs to use WiFi to connect with another portable WiFi router because the portable WiFi router consumes the same wireless resource from the cellular network and thus cannot efficiently offload any traffic from the cellular network.

After UE92 handovers to serving eNB91 (step 103), the handover event triggers eNB91 to forward the obtained WLAN information to UE92 (step 104). After receiving the WLAN information, UE92 activates WLAN access via its WLAN module when it moves inside WLAN coverage (step 105). Based on the received WLAN information, UE92 performs scanning over WLAN channels and starts to setup connection with WiFi AP94 (step 106). The WLAN connection setup may takes a long time because of various security related procedures including authentication and registration. For example, some WiFi AP will require authentication process involving user entering ID and password. To help reducing the connection setup time, the serving eNB91 may perform a series of actions including pre-authentication and pre-registration (step 107). For example, eNB91 may help to perform pre-authentication with WiFi AP94 using UE92's identify previously registered in the cellular network, to acquire WLAN access key and pass to UE92 for WiFi AP access, to pre-authenticate or pre-register UE92 to the PLMN attached to the WLAN using UE92's identity (e.g., SIM), to inform PDG to redirect selected UE packet data traffic to the WLAN, and to forward security information for accessing WiFi AP94 to UE92. After WLAN connection setup, UE92 is connected to both the cellular network and the WLAN (step 108). Data traffic of UE92 can be forwarded from the cellular network to the WLAN to improve performance and efficiency.

When UE92 later on leaves outside of WLAN coverage, it deactivates WLAN access via its WLAN module based on certain triggering conditions (step 109). The triggering conditions may be based on a notification from the serving eNB91 about the unavailability of any WiFi AP, the serving cell of UE92, the location of UE92, the footprint of UE92, the threshold of the measurement result over the serving eNB91, the threshold of the WLAN signal strength, and the threshold of achievable WLAN throughput. For example, UE92 may deactivate its WLAN module when UE92 enters another cell where UE92 receives no WiFi AP information from the eNB that serves the cell. UE92 may also deactivate its WLAN module when scanning result shows that the received signal strength from the WiFi APs indicated by the serving eNB91 are below certain threshold.

Figure 10:
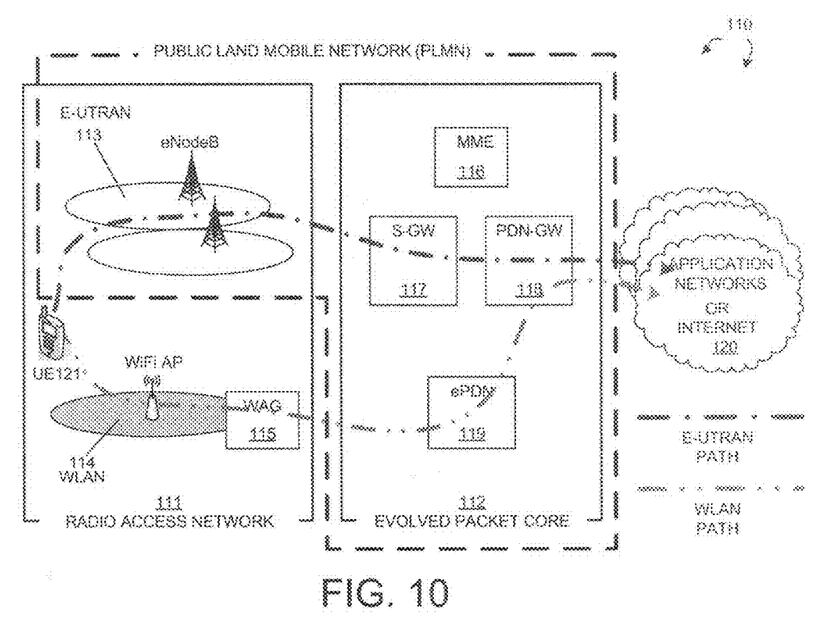
FIG. 10 illustrates an overview of network architecture for WLAN offload.

A radio access network (RAN) is only part of a wireless communication network implementing a radio access technology. FIG. 10 illustrates an overview of network architecture for WLAN offload in a wireless communication network 110. Wireless communication network 110 comprises a radio access network RAN 111 and an evolved packet core network 112. RAN 111 comprises an E-UTRAN 113 including a plurality of eNBs and a WLAN 114 including a WiFi AP and a wireless access gateway (WAG) 115, and each RAN provides radio access for user equipment UE121 via different air interfaces. Evolved packet core network 112 comprises a mobility management entity (MME) 116, a serving gateway (S-GW) 117, a packet data network gateway (PDN-GW) 118, and an enhanced PDN gateway (ePDN) 119. Evolved packet core network 112 and E-UTRAN 113 together is also referred to as a public land mobile network (PLMN). From UE121 perspective, it is equipped with both a cellular transceiver and a WiFi transceiver, and is able to access application networks or the Internet 120 via cellular access (e.g., the E-UTRAN path denoted by dashed line with single dot) or WLAN access (e.g., the WLAN path denoted by dashed line with double dots).

Figure 11:
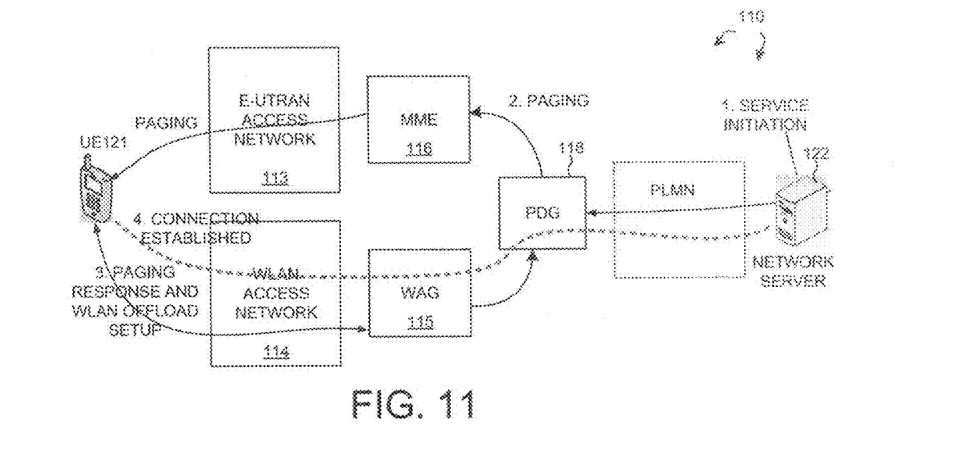
FIG. 11 illustrates one embodiment of using paging procedure to initiate a WLAN offload procedure.

FIG. 11 illustrates one embodiment of using paging procedure to initiate a WLAN offload procedure in wireless communication network 110. In the example of FIG. 11, a network server 122 uses paging procedure to initiate or update the WLAN offload procedure. In step 1, network server 122 transmits a service initiation message to PDG 118 for sending a paging message to UE121. The paging message contains information of the target WLAN for UE121 to access. In step 2, PDG 118 transmits the paging message to MME 116, which in turn forwards the paging message to UE121 via E-UTRAN access network 113. The paging message informs UE121 that whenever UE121 wants to establish connection for data service, UE121 should establish such connection through WLAN access network 114, instead of through E-UTRAN access network 113. In step 3, UE121 starts WLAN offload setup with WAG 115 and then transmits a paging response through WLAN access network 114 to the network entity that issues the paging message (e.g., PDG 118). In step 4, after paging response, WLAN connection is established and packet data service flow is established through WLAN access network 114.

Paging procedure is only one example in initiating the WLAN offload procedure. A paging message is one type of radio resource control (RRC) message that is used to transmit and forward WLAN information. In general, the WLAN information may be carried by various types of messages including the RRC message in UTRA or E-UTRA systems, the media access control (MAC) control element (CE) in UTRA or EUTRA systems, and the MAC management message in WiMAX systems.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   obtaining wireless local area network (WLAN) information of a WLAN by a serving base station in a cellular network, wherein the WLAN information comprises scanning results of the WLAN obtained by a mobile device, and wherein the mobile device connects with the cellular network and the WLAN;
   forwarding the WLAN information obtained by the mobile device to a user equipment (UE) by the serving base station based on triggering events associated with the serving base station information, WLAN coverage information, or the UE information, wherein the WLAN information is either forwarded using a paging procedure of a packet core network that the cellular network belongs to, or contained in a downlink radio resource control (RRC) message, or contained in a media access control (MAC) control element (CE) of a downlink signal, or contained in a downlink MAC management message in the cellular network, wherein the UE establishes a connection with the WLAN based on the received WLAN information; and
   offloading data traffic between the serving base station and the UE from the cellular network to the WLAN, wherein the UE connects with both the serving base station and the WLAN such that data traffic is shared between the serving base station and the WLAN.

2. The method of claim 1, wherein the WLAN information comprises a service set identifier (SSID) of a WLAN access point (AP) or a frequency channel used by the WLAN AP.

3. The method of claim 2, wherein the WLAN information comprises the access priority or principle associated with the SSID of the WLAN AP.

4. The method of claim 2, wherein the WLAN information comprises the backhaul type connected by the WLAN AP.

5. The method of claim 1, wherein the WLAN information comprises received signal strength, WLAN signal/protocol version, and WLAN mode of a WLAN access point (AP).

6. The method of claim 1, wherein the WLAN information comprises layer-3 information including at least one of a WLAN AP gateway IP address, a DNS IP address, a DHCP server IP address, a device IP address to be used in the WLAN, and I-WLAN information.

7. The method of claim 1, further comprising:
   performing pre-authentication and pre-registration with a WLAN access point (AP) based on the UE identity registered in the cellular network;
   acquiring a WLAN access key of the WLAN AP; and
   passing the WLAN access key to the UE.

8. The method of claim 1, further comprising:
   acquiring WLAN access information and forwarding the WLAN access information to the UE for WLAN access.

9. The method of claim 1, further comprising:
   informing a packet data gateway to redirect selected packet data traffic of the UE from the cellular network to the WLAN.

10. The method of claim 1, wherein the WLAN information comprises information about a WLAN access point (AP) including at least one of authentication information, charging policy, access priority, registration information, loading, capacity, achievable throughput, and service latency of the WLAN AP.

11. The method of claim 1, wherein the WLAN information is received by the serving base station from a second UE, and wherein the WLAN information comprises scanning result obtained by the second UE over WLAN frequency channels.

12. The method of claim 1, wherein the triggering event is associated with the serving base station cell coverage.

13. The method of claim 1, wherein the triggering event is associated with WLAN coverage information including a WLAN AP location and the WLAN service coverage.

14. The method of claim 1, wherein the triggering event is associated with the UE information including device location, device footprint, device measurement result over the serving base station, or device WLAN capability.

15. A method comprising:
obtaining wireless local area network (WLAN) information of a WLAN by a user equipment (UE) in a cellular network, wherein the WLAN information is transmitted in a paging message from a serving base station in the cellular network, and wherein the WLAN information comprises scanning results of the WLAN by a mobile device connected with both the cellular network and the WLAN, and wherein the UE is equipped with both a cellular module and a WLAN module;
activating access to a WLAN via the WLAN module based on the obtained WLAN information such that the UE has capability to connect with both the cellular network and the WLAN;
sending a paging response through the WLAN to a network entity in the cellular network in response to the paging message; and
offloading data traffic from the cellular network to the WLAN, wherein the UE simultaneously connects to the cellular network and the WLAN such that data traffic is shared between the cellular network and the WLAN.

16. The method of claim 15, wherein the UE activates the access to the WLAN when it handovers to the serving base station.

17. The method of claim 15, wherein the UE activates the access to the WLAN and scans a WLAN access point (AP) over the WLAN frequency channel based on the WLAN information.

18. The method of claim 15, wherein the UE selects a WLAN access point (AP) from a plurality of WLAN APs and performs connection setup with the WLAN AP based on the WLAN information.

19. The method of claim 15, further comprising:
deactivating the access to the WLAN via the WLAN module based on a triggering condition, wherein the triggering event is derived from the WLAN information received from the serving base station.

20. The method of claim 19, wherein the triggering condition comprises a notification from the serving base station, and wherein the notification contains WLAN coverage information.

21. The method of claim 19, wherein the triggering condition comprises UE device information including UE location, UE footprint, or UE measurement result over the serving base station.

22. The method of claim 19, wherein the triggering condition comprises WLAN threshold information including WLAN signal strength threshold or WLAN throughput threshold.

* * * * *